United States Patent Office 3,324,042
Patented June 6, 1967

3,324,042
METHOD FOR THE FORMATION OF
PERLITE STRUCTURES
Roger A. MacArthur, Hinsdale, and Anthony L. Garnero, Wheaton, Ill., assignors, by mesne assignments, to Central Manufacturing District, Chicago, Ill., a trust of Massachusetts
No Drawing. Filed Feb. 17, 1965, Ser. No. 433,497
5 Claims. (Cl. 252—378)

This invention relates to a method for the formation of perlite structures and to the structures resulting from the method. In particular, the invention is concerned with the production of expanded perlite which can be used for the formation of lightweight structural panels and for other known applications for lightweight agglomerated materials.

The use of expanded perlite in the production of lightweight structural elements comprising agglomerates of the expanded perlite particles has previously been recognized. In applicants' copending application Ser. No. 57,171, filed Sept. 20, 1960, and entitled, "Panels of Expanded Perlite and Method and Machine for Same," there is a discussion relative to the production of such panels. As noted therein, expanded perlite structures can be produced with the structures being characterized by relatively high strength, low density, good dimensional stability, good appearance, and good acoustical properties.

The production of expanded perlite for use in the formation of structural panels differs considerably from the production of similar panels produced from clay or shale particles. A complete discussion of such differences is set forth in said copending application; however, the basic distinction lies in the fact that the reaction of perlite during expansion in response to heat differs materially from the conditions prevailing in the treatment of clay or shale. Perlite is characterized by the presence of combined water which begins to be released when the perlite is heated to about 1200° F. The combined water and re-released vapors act as a plasticizer for the perlite particles whereby a plasticity is experienced during continued heating above 1400° F. Agglomeration can be achieved if the particles are rapidly heated to a temperature within the range where vapor release and plasticity occur simultaneously, for example in the temperature range of 1400–2400° F. and preferably between 1600 and 2400° F.

In the perlite reaction, the elimination of the combined water requires heating to a temperature above 1800° F. and in most cases, between 2200 and 2400° F. This is required since the removal of the combined water prevents fusion or reduction of the perlite to a pyroplastic state at lower temperatures. Accordingly, plasticity for purposes of agglomeration can only be achieved by heating to a fusion stage preferably in excess of 2200° F., if combined water has been driven out. Therefore, slow heating of the perlite particles is undesirable since the elimination of the combined water prior to the achieving of a pyroplastic state will substantially decrease the amount of expansion that will occur and will require heating to excessive temperatures to achieve fusion. Even at this second stage of fusion, any expansion which may have previously been achieved will tend to be lost by collapse of the expanded particles, and the heating will also reduce the perlite to a relatively fluid state resulting in the formation of a glassy phase.

The aforementioned copending application achieves the formation of perlite panels having the desired characteristics by controlling the treatment of the perlite within certain limits. Specifically, the disclosure provides a treating operation which provides for the rapid heating of perlite particles to a temperature between 1400 and 2000° F. The rapid heating is accomplished in a few minutes during travel of the perlite through a furnace, and the desired expansion and agglomeration will occur when the operation is properly controlled.

In the discussion of the aforementioned copending application, reference is made to the use of a flux in combination with the perlite particles. This flux acts to improve the quality of the completed panels since the flux collects on the surfaces of the perlite particles and functions as a binder to more effectively secure the expanded particles one to another in the final structure. The fluxes employed also react with surface portions of the perlite and result in a lower melting point combination.

It is considered desirable to employ fluxes in procedures of the type described; however, the use of such fluxes has been found to produce certain disadvantages. These problems relate to the fact that perlite expanded with continued heating will gradually fuse to a more or less dense mass with the time necessary for fusion depending upon the temperature and type of perlite ore. When a flux is employed, the time required for sintering is considerably shortened and, therefore, the heating of the perlite must be carefully controlled so that the desired amount of sintering will take place without any additional heating which would lead to fusion and substantial loss in the amount of expansion.

It has also been recognized that the sintered or agglomerated product containing active flux will have less desirable characteristics from the standpoint of temperature resistance. Thus, the presence of the active flux will tend to produce a lower softening point in the final product whereby the panels produced will have a maximum temperature of use less than panels which do not contain such flux.

The disadvantages recognized in the prior techniques can be overcome to a large extent by employing the techniques described in applicants' copending application Ser. No. 433,448, filed Feb. 17, 1965, and entitled, "Expanded Perlite and Method for the Formation Thereof." In the procedure described therein, amounts of clay are employed in combination with perlite and a flux whereby the advantages of the flux can be realized, but wherein the clay acts to eliminate or substantially reduce the disadvantages previously recognized when a flux was employed.

It is an object of this invention to provide a method for the formation of expanded perlite which will also eliminate certain disadvantages recognized with respect to previously employed techniques.

It is a more particular object of this invention to provide a method for the preparation of perlite panels which is not dependent to a significant extent on precise time and temperature limitation whereby the procedure can be conducted on a highly efficient basis.

It is a still further object of this invention to provide improved products comprising expanded perlite panels wherein the products are characterized by high strength and temperature resistance whereby the products can be employed in a wide variety of applications.

These and other objects of this invention will appear hereinafter and it will be understood that the specific examples hereinafter set forth are provided primarily for purposes of illustration and are not included for purposes of limitation.

The method of this invention generally involves the formation of expanded perlite particles into agglomerates whereby the combined particles can be employed as in the formation of structural panels. In undertaking the expansion of perlite particles for the ultimate formation of the products of this invetnion, it will be appreciated that various conventional techniques are available. Thus, the concepts of this invention are applicable for use in combination with various other known techniques since the particular manner in which the expanded particles are formed is not a critical aspect of this invention.

The instant invention generally involves the combination of clay particles with perlite whereby the clay is adapted to react with the surfaces of the perlite and whereby the clay will be integrated within the agglomerated combination of expanded perlite when the processing is completed. It will be understood that the instant invention contemplates admixture of clay particles with perlite particles after the latter have been expanded. It is recognized, however, that the most advantageous results are achieved when the combination of perlite particles and clay particles is formed prior to the expansion treatment. With this arrangement, the clay will react with the perlite in a more thorough fashion to more effectively achieve the beneficial results of this invention.

In the practice of the instant invention in its preferred form, clay particles are combined with perlite particles, and the combination is exposed to heat for expansion. The heating is continued to the extent that the particles achieve a pyroplastic state for purposes of expansion and to the extent that fusion will occur on the surfaces of the heated particles for agglomeration into a unitary mass. Reference is made to the aforementioned copending application Ser. No. 57,171 for one example of an arrangement which can be employed for accomplishing the desired expansion and agglomeration. As noted above, various other conventional techniques are also available for achieveing the results of this invention.

Where clay is employed along with the perlite particles, the resulting mass is found to be characterized by superior properties from the standpoint of amount of expansion and structural strength. It is believed that the clay reacts with the bloated perlite particles to stiffen the surfaces of the particles. When such a reaction occurs, there is a significantly reduced tendency for the mass to shrink even after extended heating periods. Furthermore, the stiffening which occurs will be retained in the final product whereby panels produced from the product will be more resistant to distortion as by compressive forces.

In the preferred form of the invention, fine particles of clay are mixed with fine particles of perlite, and heating for expansion and agglomeration is undertaken on this mixture. One to 10 parts of clay for every 10 parts of perlite represents the preferred composition range for mixtures contemplated in accordance with this invention.

Suitable clays comprise the grade UC55 clay produced by United Clay Mines or ASP 170 produced by the Mineral Chemicals Philipp Corporation. Kaolin clay is generally considered to be the most suitable for the purposes of this invention; however, any of the clays referred to or their equivalents are contemplated. Such clays are preferably provided in fine particle form with a substantial proportion being finer than one micron. It will be understood that the size of the clay particles is preferably fine due to the fact that fine particles will more readily enter into reactions. The size of these particles is referred to only for the purpose of expressing conventional reaction techniques, and it will be understood that the invention is not to be limited by any particular size ranges.

To demonstrate the advantageous results of this invention, perlite was expanded under conditions which are considered severe in accordance with conventional techniques. Specifically, the perlite was brought up to 1700° F. in one hour and then raised to 1900° F., a temperature well beyond the softening point of the perlite used, and held at this higher temperature for an additional half hour.

Where clay was not present along with the perlite, shrinkage, based on maximum expansion, amounted to more than 70 percent of the volume. The addition of two parts of kaolin for every 10 parts of perlite reduced the shrinkage figure to about 20 percent while a figure of less than five percent was achieved where approximately equal amounts of clay and perlite were employed.

The advantageous results of the invention were also dramatically demonstrated when the perlite was first expanded, and then clay particles were mixed with the expanded perlite. When the mixture was heated to about 1900° F., shrinkage of only 28 percent by volume was recognized with clay particles present in a ratio of 2:10, while a ratio of 4:10 produced shrinkage of only nine percent. Testing under these conditions is considered more severe since there is less opportunity for the clay particles to react with the already expanded perlite particles; however, the results represent a vast improvement over the results achieved when perlite is heated at high temperatures in the absence of clay. Although the instant invention does not exclude the use of a flux in combination with the clay and perlite, it will be appreciated that the reaction of clay and perlite is distinct from the reaction recognized where clay and flux are employed together in combination with perlite. In such a case, it is believed that the clay reacts in some way with the flux to thereby limit the fluxing action to the stage of the processing where it can be most beneficial. In the instant case, the clay is believed to react directly with the perlite and, therefore, the presence or absence of a flux is only incidental insofar as this invention is concerned.

The procedures discussed in copending application Ser. No. 57,171 are generally suitable for conducting the techniques of this invention although time and temperature are not critical factors to the extent discussed in said application. In a typical process, the perlite particles in combination with the clay particles are heated to a temperature within the range of 1600 to 2400° F. The heat is preferably uniformly distributed throughout the mass of particles, and heating is continued for a time sufficient to cause the particles to expand and to achieve a state of fusion to the extent that the expanded particles will agglomerate into a self-sufficient mass. The heating is discontinued as soon as possible after the desired state is achieved in the agglomerated perlite. It will be recognized, however, that this desired state will be maintained over a significantly longer period under the temperature conditions prevailing whereby detrimental shrinkage will not result as long as the time limits are controlled to a reasonable degree.

It will be understood that various changes and modifications may be made in the above described invention which provide the characteristics of this invention without departing from the spirit thereof particularly as defined in the following claims.

That which is claimed is:

1. In a process for treating perlite wherein the perlite is first heated to a temperature which causes the perlite to expand and is thereafter heated whereby surface portions of the expanded perlite are fused to result in sintering of the perlite into an agglomerated mass, the improvement comprising including from one to 10 parts of clay for every 10 parts of perlite in admixture whereby said clay is adapted to react with the perlite and rapidly heating the mixture to a temperature within the range of 1600–2400° F. to effect fusion between the expanded perlite particles and reaction between the clay and the surface portions of the fused perlite.

2. In a process for treating perlite wherein the perlite is first heated to a temperature which causes the perlite to expand and is thereafter heated whereby surface portions of the expanded perlite are fused to result in sintering of the perlite into an agglomerated mass, the improvement comprising including from one to 10 parts of kaolin for every 10 parts of perlite in admixture whereby said kaolin is adapted to react with the perlite and rapidly heating the mixture to a temperature within the range of 1600–2400° F. to effect fusion between the expanded perlite particles and reaction between the clay and the surface portions of the fused perlite.

3. In a process for treating perlite wherein the perlite is first heated to a temperature which causes the perlite to expand and is thereafter heated whereby surface portions of the expanded perlite are fused to result in sintering of the perlite into an agglomerated mass, the improvement comprising forming a mixture including perlite and kaolin, said mixture comprising finely divided particles with said kaolin being present in an amount between one and 10 parts by weight per 10 parts by weight perlite, and rapidly heating the mixture to a temperature within the range of 1600–2400° F. to effect fusion between the expanded perlite particles and reaction between the clay and the surface portions of the fused perlite and heating to form said agglomerated mass.

4. A process in accordance with claim 3 wherein said perlite that is admixed with the kaolin is unexpanded perlite.

5. The product produced by the process of claim 1.

References Cited

UNITED STATES PATENTS

| | | | |
|---|---|---|---|
| 1,927,102 | 9/1933 | Sucetti et al. | 252—378 |
| 2,526,073 | 10/1950 | Gardner | 252—378 |

OSCAR R. VERTIZ, *Primary Examiner.*

H. S. MILLER, *Assistant Examiner.*